United States Patent
Joshi et al.

(10) Patent No.: US 11,195,009 B1
(45) Date of Patent: Dec. 7, 2021

(54) INFRARED-BASED SPOOF DETECTION

(71) Applicant: EyeVerify, Inc., Kansas City, MO (US)

(72) Inventors: Yash Joshi, Kansas City, MO (US); Reza R. Derakhshani, Shawnee, KS (US)

(73) Assignee: EyeVerify, Inc., Kansas City, MO (US)

( * ) Notice: Subject to any disclaimer, the term of this patent is extended or adjusted under 35 U.S.C. 154(b) by 0 days.

(21) Appl. No.: 17/224,923

(22) Filed: Apr. 7, 2021

(51) Int. Cl.
*G06K 9/00* (2006.01)
*G07C 9/00* (2020.01)
*G06T 7/90* (2017.01)
*G06T 7/00* (2017.01)

(52) U.S. Cl.
CPC ........ *G06K 9/00617* (2013.01); *G06T 7/0014* (2013.01); *G06T 7/90* (2017.01); *G07C 9/00563* (2013.01); *G06T 2207/20081* (2013.01); *G06T 2207/30041* (2013.01)

(58) Field of Classification Search
CPC ........... G06K 9/00604; G06K 9/00906; G06K 9/00597; G06K 9/00899; G06F 21/32; G06T 2207/30041; G06T 2207/10048
See application file for complete search history.

(56) References Cited

U.S. PATENT DOCUMENTS

| | | | | |
|---|---|---|---|---|
| 2013/0089241 A1* | 4/2013 | Malhas | .............. | G06K 9/00906 382/117 |
| 2013/0223681 A1* | 8/2013 | Lee | .................... | G06K 9/00899 382/103 |
| 2016/0019420 A1* | 1/2016 | Feng | .................. | G06K 9/00906 382/117 |
| 2016/0117544 A1* | 4/2016 | Hoyos | ................ | G06K 9/00604 348/78 |
| 2016/0171323 A1* | 6/2016 | Gadde | .................. | G06K 9/4638 382/117 |
| 2017/0091550 A1* | 3/2017 | Feng | .......................... | G06T 7/38 |
| 2018/0349721 A1* | 12/2018 | Agrawal | ............ | G06K 9/00617 |
| 2020/0134345 A1* | 4/2020 | Joshi | .................. | G06K 9/00906 |
| 2020/0293640 A1* | 9/2020 | Joshi | .................. | G06K 9/00906 |

OTHER PUBLICATIONS

Lee, Sung Joo, et al. "Multifeature-based fake iris detection method." Optical Engineering 46.12 (2007): 127204.*

(Continued)

*Primary Examiner* — Li Liu
(74) *Attorney, Agent, or Firm* — Fish & Richardson P.C.

(57) ABSTRACT

Methods, systems, and apparatus, including computer programs encoded on computer-readable storage media, are provided. In one aspect, a first image of an eye region of a subject is received, the first image captured under illumination by electromagnetic radiation having a wavelength in the 850 nm-1100 nm range. Based on the first image, a metric indicative of differential absorption of the electromagnetic radiation by an iris of the subject and a sclera of the subject is determined. It is identified, based on the metric, that the subject is a spoof representation of a human. Responsive to identifying that the subject is a spoof representation of a human, access to a secure system is prevented.

20 Claims, 7 Drawing Sheets

(56) References Cited

OTHER PUBLICATIONS

S. J. Lee, K. R. Park and J. Kim, "Robust Fake Iris Detection Based on Variation of the Reflectance Ratio Between the IRIS and the Sclera," 2006 Biometrics Symposium: Special Session on Research at the Biometric Consortium Conference, 2006, pp. 1-6, doi: 10.1109/BCC.2006.4341624.*

J. Galbally and M. Gomez-Barrero, "A review of iris anti-spoofing," 2016 4th International Conference on Biometrics and Forensics (IWBF), 2016, pp. 1-6, doi: 10.1109/IWBF.2016.7449676.*

I. Pavlidis and p. Symosek, "The imaging issue in an automatic face/disguise detection system," Proceedings IEEE Workshop on Computer Vision Beyond the Visible Spectrum: Methods and Applications (Cat. No.PR00640), 2000, pp. 15-24, doi: 10.1109/CVBVS.2000.855246.*

\* cited by examiner

INFRARED-BASED SPOOF DETECTION

FIELD OF THE DISCLOSURE

The present disclosure relates to spoof detection using eye images

BACKGROUND

Systems incorporating a biometric identification technology such as face recognition or iris recognition often include a camera that captures an image of a user. The captured image can be then processed to authenticate the user using the biometric identification technology.

SUMMARY

In one aspect, the present disclosure describes a method for detecting spoof attacks on a secure system. The method includes: receiving, by one or more processing devices, a first image of an eye region of a subject captured under illumination by electromagnetic radiation having a wavelength in the 850 nm-1100 nm range; determining, by the one or more processing devices, based on the first image, a metric indicative of differential absorption of the electromagnetic radiation by an iris of the subject and a sclera of the subject; identifying, by the one or more processing devices, based on the metric, that the subject is a spoof representation of a human; and responsive to identifying that the subject is a spoof representation of a human, preventing, by the one or more processing devices, access to the secure system.

Another aspect of the present disclosure describes a system. The system includes one or more image acquisition devices configured to capture a first image of an eye region of a subject under illumination by electromagnetic radiation having a wavelength in the 850 nm-1100 nm range, and one or more processing devices configured to perform operations. The operations include receiving the first image of the eye region of the subject; determining, based on the first image, a metric indicative of differential absorption of the electromagnetic radiation by an iris of the subject and a sclera of the subject; identifying, based on the metric, that the subject is a spoof representation of a human; responsive to identifying that the subject is a spoof representation of a human, preventing access to a secure system.

Another aspect of the present disclosure describes one or more machine-readable storage devices. The machine-readable storage devices store machine-readable, non-transitory instructions that, when executed by one or more processing devices, cause the one or more processing devices to perform operations. The operations include: receiving a first image of an eye region of a subject captured under illumination by electromagnetic radiation having a wavelength in the 850 nm-1100 nm range; determining, based on the first image, a metric indicative of differential absorption of the electromagnetic radiation by an iris of the subject and a sclera of the subject; identifying, based on the metric, that the subject is a spoof representation of a human; and responsive to identifying that the subject is a spoof representation of a human, preventing access to the secure system.

Any of these aspects, or other aspects described throughout this disclosure, may include any one or more of at least the following features and characteristics.

In some implementations, the metric indicative of differential absorption includes a metric of statistical dispersion of brightness in the first image.

In some implementations, identifying that the subject is a spoof representation of a human includes determining that the metric indicative of differential absorption is above a predetermined threshold value.

In some implementations, determining the metric indicative of differential absorption includes determining a feature vector based on the first image, the feature vector including brightness values of the iris and of the sclera. In some implementations, identifying that the subject is a spoof representation of a human includes inputting the feature vector into a trained machine learning model, the trained machine learning model producing an output indicating that the subject is a spoof representation of a human.

In some implementations, determining the metric indicative of differential absorption includes identifying a portion of the first image that includes an eye of the subject, and determining the metric indicative of differential absorption based on the portion of the first image.

In some implementations, the first image includes skin of the subject, and determining the metric indicative of differential absorption is based on a brightness of the skin in the first image.

In some implementations, a second image of the eye region of the subject is received. The second image is captured under illumination by electromagnetic radiation having a wavelength in the 380 nm-780 nm range. Identifying that the subject is a spoof representation of a human is based on the metric and the second image.

In some implementations, a color of the iris is identified based on the second image. Identifying that the subject is a spoof representation of a human is based on the metric and the color of the iris.

In some implementations, a light environment of the subject is determined based on the second image. An expected change in pupil size of the subject based on the light environment is determined. Identifying that the subject is a spoof representation of a human is based on the metric and the expected change in pupil size.

Implementations of the subject matter described in this specification can be implemented to realize one or more of at least the following advantages. For example, in some implementations, the disclosed methods may be performed using fewer computational resources compared to other methods. In some implementations, computational resources used in authentication may be reduced by terminating the authentication process based on spoof identification. User burden may be reduced by performing infrared eye imaging as part of another biometric imaging process.

The details of one or more implementations are set forth in the accompanying drawings and the description below. Other aspects, features and advantages will be apparent from the description and drawings, and from the claims.

DETAILED DESCRIPTION

Biometric authentication systems can authenticate a user of a secure system based on recognizing the user's face, eye-print, iris, etc. Such biometric authentication systems involve capturing one or more images of the user and executing corresponding recognition processes on the captured image. Malicious attempts to breach the security of such biometric authentication systems can include presenting an alternative representation of a live person to gain access to an account or other privileges associated with the identity of the corresponding live person. The alternative representation may take the form of an image displayed on a monitor, a printed image, a three-dimensional representation (e.g., a facial statue or mask), or another object. Such attacks are generally known as spoof attacks, and the reliability/security of a biometric authentication system can be determined by the ability of the system to differentiate between a live person and corresponding alternative representations (also referred to as spoofs).

Implementations of the present disclosure use differential infrared absorption by different portions of a human eye to identify spoofing attempts, e.g., for kiosk devices or mobile devices (such as smartphones, tablet computers, or e-readers).

Figure 1:
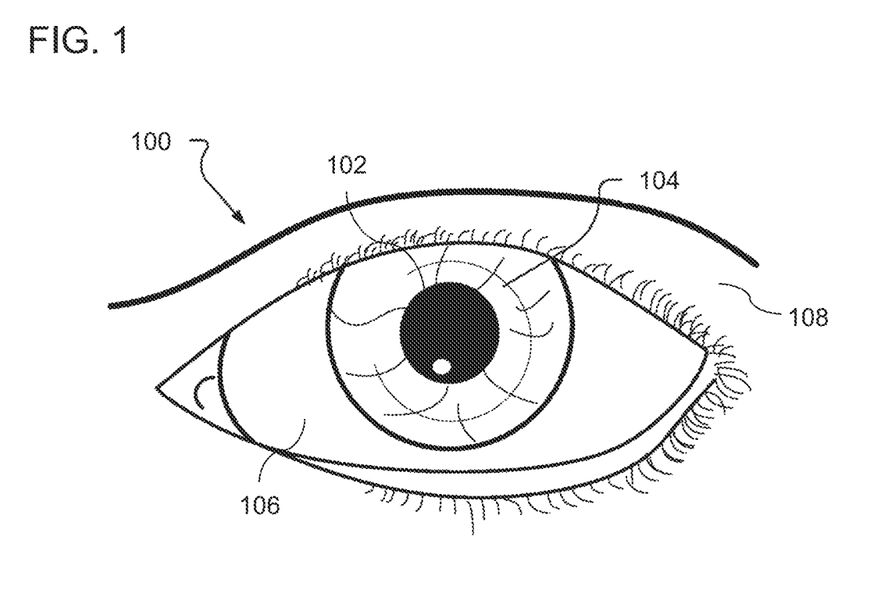
FIG. 1 is a schematic of an eye.

As shown in FIG. 1, a human eye 100, when viewed from the front, presents three primary regions. At the center of the eye, the pupil 102 allows light to enter the eye 100 and strike the retina (not shown). Surrounding the pupil 102, the colored iris 104 expands and contracts to control light intake into the pupil 102. Finally, the primarily white sclera 106 surrounds the iris 104, supporting and protecting other portions of the eye 100. Outside the eye 100, skin 108 is also typically captured as part of an "eye crop," which is an image of a human eye and adjacent regions (e.g., skin, eyelid, etc.).

The different regions of the eye 100 have different spectral characteristics. Specifically, the sclera 106 includes a significant amount of water, which is comparatively strongly absorbing of infrared light (for example, light having a wavelength between about 850 nm and about 1100 nm). In comparison, the iris 104 includes less water and more melanin, which absorbs less strongly in the infrared range than in the visible range. Light in the visible range may have a wavelength between about 380 nm and about 780 nm.

The combination of these two effects means that a brightness difference between the sclera 106 and the iris 104 is typically less in an infrared image (an image captured under infrared illumination and/or by an infrared photosensor) than in a corresponding visible image (an image captured under visible illumination and/or by a visible photosensor). Equivalently, a measure of contrast between the sclera 106 and the iris 104 will tend to be less in an infrared image than in an equivalent visible image.

This tendency can be exploited to detect spoofing attempts. Spoofing attempts often mimic authentic eye images in the visible range, e.g., by displaying, on a monitor, a visible-spectrum picture of an eye, or by presenting a physical, appropriately-colored replica of an eye. However, these spoofed eye images often do not accurately mimic real eyes in the infrared range. For example, an image of an eye displayed on a monitor may not display the aforementioned absorption difference between the sclera and iris when imaged under infrared light. Therefore, metrics indicative of differential infrared absorption between the iris and the sclera can serve as spoofing indicators.

Figure 2A:
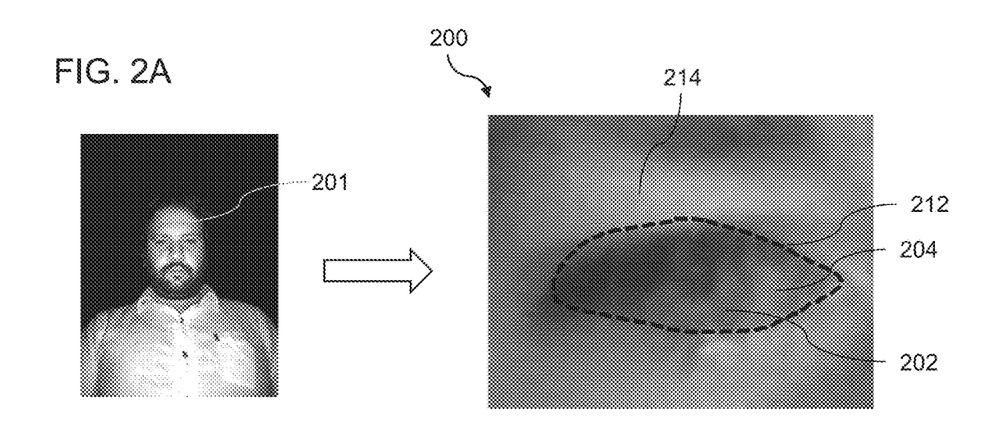
FIGS. 2A-2B are front views of example subjects and corresponding example infrared eye images.
Figure 2B:
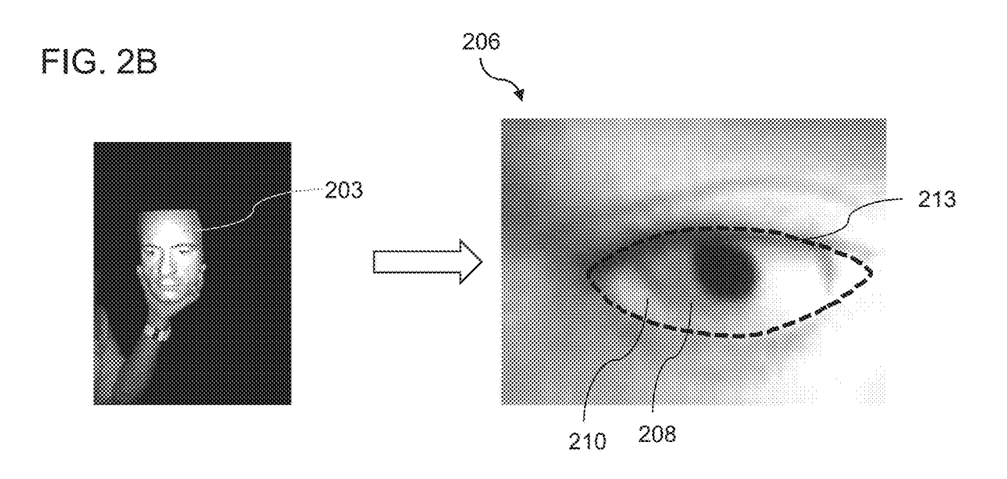

FIGS. 2A-2B show example infrared images of an authentic eye image 200 captured from an authentic human subject 201 (FIG. 2A) and a spoofed eye image 206 captured from a facial mask 203 (FIG. 2B). In the authentic eye image 200, the iris 202 and sclera 204 show relatively little contrast, while in the spoof eye image 206 the iris 208 and sclera 210 show a significant difference in absorption, in line with the physical principles noted above.

Figure 3:
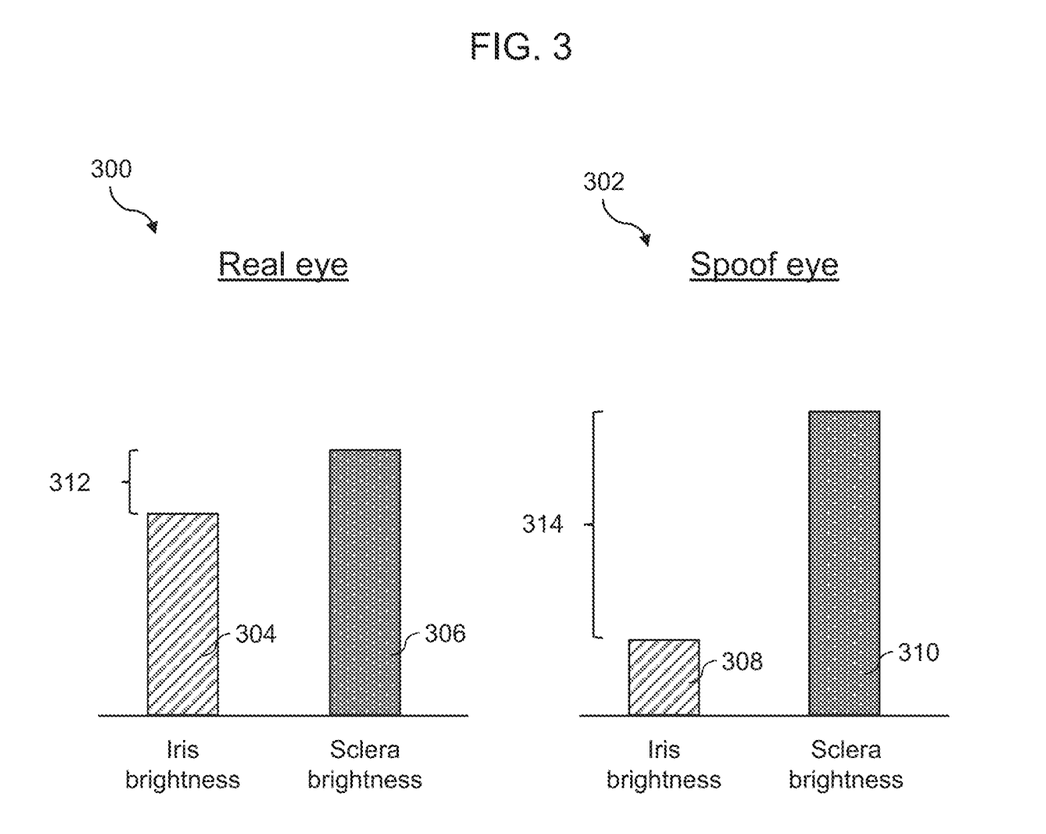
FIG. 3 is a diagram showing example differential absorption by a real eye and a spoof representation of an eye

FIG. 3 shows hypothetical graphical examples of differential absorption by real eyes and spoof eyes under infrared illumination. Values shown are not to scale and do not correspond to actual obtained data; rather, this figure is meant to illustrate the concept of differential absorption without suggesting any particular numerical values or requirements.

As shown in plot 300, in an infrared image of a real eye, a relatively small brightness difference 312 exists between iris brightness 304 and sclera brightness 306. As described throughout this disclosure, the brightness difference 312 is relatively small because water in the sclera is highly absorbing of infrared light and because the iris includes less water than the sclera.

As shown in plot 302, in an infrared image of a spoof eye, the brightness difference 314 between the iris brightness 308 and the sclera brightness 310 is significantly larger than the brightness difference 312 for the real eye. Spoof representations (e.g., representations displayed on a monitor or printed on paper or a mask) are unlikely to have the same underlying compositional differences that give rise to the smaller brightness difference 312. Rather, the brightness difference 314 depends more on other factors, e.g., different displayed or printed colors of the iris and sclera in the spoof representation, and therefore is often larger than the brightness difference 312.

As described throughout this disclosure, the difference between brightness difference 312 and brightness difference 314 can be used to determine whether a given eye image is based on a real eye or a spoof representation.

Figure 4:
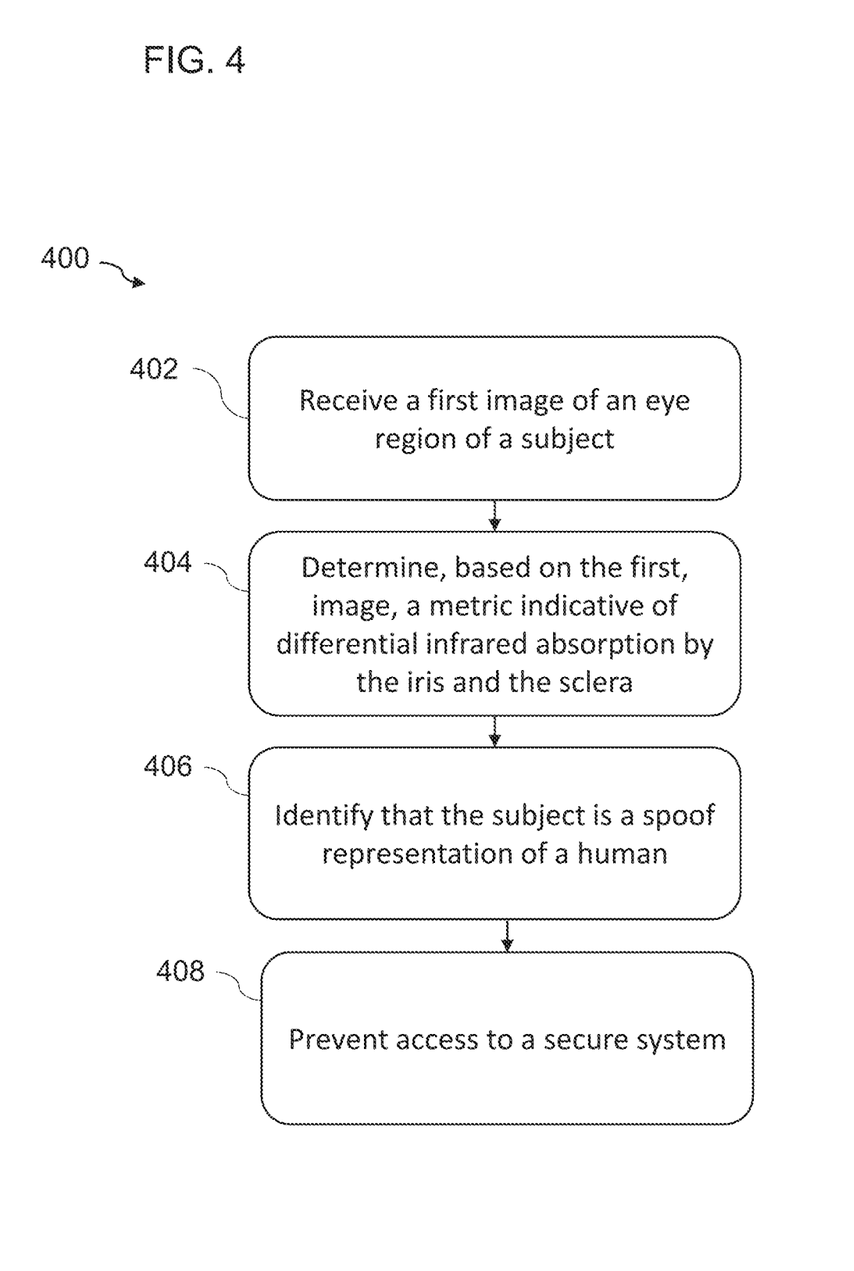
FIG. 4 is a flowchart of an example process for identifying a spoof representation in accordance with one or more implementations of the present disclosure.

FIG. 4 shows an example method 400 that employs spoof detection based on differential absorption. The example method 400, and other methods described herein, may be performed when a user requests to access a secure system (e.g., to unlock a computing device, make a payment, etc.). The secure system is gated by a biometric authentication system, e.g., a facial recognition system or an ocular recognition system (e.g., iris recognition), that is configured to capture an image of the user and compare the captured image to a template representative of an authorized user. Method 400 may be used as a preliminary check to filter out spoofing attempts (e.g., as a precondition of biometric authentication), or a result of method 400 may be combined with one or more other results to provide an overall spoofing identification and/or authentication result, as described in further detail below.

An image of an eye region of a subject is obtained, the image captured while the subject is illuminated by infrared light (402). In general, the subject may be an authentic representation of a human or may be a spoof representation of a human; however, method 400 is an example method for the case where the subject is identified as a spoof representation of a human.

In various implementations, one or more infrared wavelengths may be used for the illumination. In some implementations, the infrared image is captured under illumination by light having a wavelength of between about 900 nm and about 1000 nm, e.g., about 940 nm.

In some implementations, the image is captured as an eye crop. In some implementations, the image is extracted from a full facial image, e.g., from a facial image captured as part of a biometric authentication process.

In some implementations, multiple images are captured. One or more images may be selected from the multiple images for further analysis, e.g., images in which the subject is blinking may be discarded. In some implementations, multiple images are processed to determine corresponding metrics indicative of differential absorption, and the multiple metrics from the multiple images are combined (e.g., averaged) to determine an overall metric.

Based on the image, a metric indicative of differential absorption of the infrared light by an iris of the subject and a sclera of the subject is determined (404), and, based on the metric, it is identified that the subject is a spoof representation of a human (406).

Various metrics and methods may be used to quantify the differential infrared absorption. In some implementations, an overall metric is calculated for the image based on a predetermined algorithm, and the overall metric is compared to a threshold value. For example, a statistical dispersion of brightness (e.g., a standard deviation of brightness or a range of brightness) may be calculated for an eye crop or a portion of an eye crop. If the statistical dispersion is greater than a predetermined threshold (e.g., indicating high infrared absorption differences between the iris and sclera, as in FIG. 2B), then it is determined that the image shows a spoof representation. In some implementations, the determination is based on bounded ranges. For example, a standard deviation greater than a first value and less than a second value may be indicative of an authentic eye images, while standard deviation values less than the first value or greater than the second value may indicate a spoof and/or an image capture failure.

In some implementations, the metric is determined based on pixel-wise values, e.g., pixel-wise brightness values. In some implementations, groups of adjacent pixels are grouped together, a metric indicative of differential absorption is calculated for each group of adjacent pixels, and an overall metric is determined based on the values corresponding to each group.

In some implementations, spoof detection includes image segmentation to isolate an eye portion of an image (e.g., to isolate the eye portion from a larger eye region captured in the image). A computer vision algorithm may identify an eye portion of the image (e.g., as distinct from surrounding skin and other facial features), and subsequent absorption metric determinations (e.g., calculations of a statistical dispersion of brightness) may be performed on just the identified eye portion. Segmentation may be performed using, for example, edge detection, region detection (e.g., using Haar-like features), a machine learning method such as a trained classifier, and/or another computer vision method. In some implementations, the eye portion is an image portion between an upper eyelid and a lower eyelid. Example eye portions 212, 213 are shown in FIGS. 2A-2B. Removal of skin, the pupil, or other areas besides the iris and the sclera from analyzed eye regions can decrease potential false positives and/or negatives due to skin color variations, iris size variations, or other obfuscating features.

In some implementations, computer vision methods are used to identify a distinct iris region and sclera region, and the metric of differential absorption is calculated based on comparing the two distinct regions, for example, by calculating average or median brightness values for the two regions separately and then comparing the two average or median brightness values. The resulting metric of differential absorption may be compared to a threshold value as described above.

In some implementations, a machine learning approach is used instead of, or in addition to, a predetermined algorithmic approach such as calculation of a metric of dispersion. A machine learning model is trained on a large dataset of sample eye images labeled as "spoof" or "authentic," learning to distinguish between the two. The machine learning model may take the form of a neural network, a support vector machine, or another machine learning model.

In some implementations, a publicly-available, pre-trained convolutional neural network (CNN) is used for transfer learning. The CNN may be, for example, a pre-trained ResNet50 trained on near-infrared authentic and spoof sample images. The pre-trained network need not be specifically focused on identifying live images and spoof images—rather, it may be a general-purpose network trained to identify objects, perform image classification, etc.

One or more first layers of the CNN are frozen, and one or more second layers (e.g., a last layer such as a classification layer) are modified and retrained to perform two-class classification (authentic eye vs spoof representation of an eye). The one or more second layers are retrained using a proprietary dataset that includes authentic-labeled and spoof-labeled images.

In some implementations, rather than performing retraining, the one or more second layers of the pre-trained CNN are removed, and an output of the remaining layers of the next is used to train a support vector machine (using the proprietary dataset) to identify authentic images and spoof representations. Principal component analysis may be performed on the remaining layers before retraining in order to reduce a number of features of these layers.

When an image to be authenticated is received, a feature vector is calculated from the image or from one or more identified portions of the image. The metric indicative of differential absorption effectively includes this feature vector. Values included in the feature vector may include pixel-wise image parameters such as brightness and color. Some or all values in the feature vector may be generated by a CNN (e.g., a CNN as described above), which extracts deep features from the input image using convolutional filtering, downsampling, and/or other image processing methods. The feature vector may include values indicative of textures, edges, and/or shapes in the image.

In some implementations, the machine learning model includes a one-class classifier trained to identify authentic representations of a human. The one-class classifier may be trained on authentic sample images only, obtaining a boundary defining a set of compact discriminative features of authentic eye images. In some implementations, the feature space encompassed by the boundary is discovered by binary training of authentic vs spoof sample images using a CNN, and discovered features prior to the binary classifier head are used to train a one-class classifier. The one-class classifier may be, in various implementations, a fitted Gaussian Mixture Model or a one-class support vector machine.

If the one-class classifier, based on an input feature vector, does not identify the feature vector as indicating an authentic representation, then it is determined that the subject is a spoof representation.

In some implementations, a dataset of spoof images is augmented by samples produced by a generative adversarial network.

The machine learning model may be configured based on a predetermined target threshold of false rejections. That is, during training of the model, a sensitivity of the model is adjusted until the target threshold of false rejections is met, e.g., until a target percentage of authentic eyes are wrongly determined to be spoof representations of eyes. A similar approach may be used for simpler algorithmic approaches. For example, the predetermined threshold of the metric (above which a spoof representation is identified) may be adjusted in advance to provide a particular ratio of false rejections for a set of sample images.

Whether a predetermined algorithmic approach, a machine learning-based approach, or both, is used, in some implementations a determined output of image processing is not a binary "spoof" or "authentic" determination. Rather, the output may indicate a probability (a "score") that the image is a spoof or is authentic. For example, a score from 0 to 1 may be output, where 0 indicates an authentic eye image, 1 indicates a spoof eye image, and values in between correspond to higher or lower probabilities of spoof/authentic eye images.

Compared to a machine learning-based approach, a predetermined algorithmic approach may be computationally simpler, allowing for rapid spoof detection even on devices without significant computing resources, e.g., mobile devices. However, in some implementations, machine learning-based approaches are applied on mobiles devices.

In some implementations, portions of an image besides the iris and sclera may be identified and analyzed to help determine whether an image shows a spoof representation. For example, in some implementations, a skin region located in the image is identified (e.g., skin region 214 in FIG. 2A), and a metric indicative of skin absorption of the infrared light is determined. This metric indicative of skin absorption may be an input to a predetermined algorithm, included in a feature vector input to a machine learning model, or otherwise used as a basis on which the identify a spoof representation of a human. Skin tends to absorb more infrared light than non-skin materials, leading to darker regions in infrared images. Therefore, when skin is included, a metric of differential absorption for authentic eye images may be different (e.g., lower) than if skin is not included. A threshold in an algorithmic determination process may be adjusted correspondingly, and/or machine learning models may be trained to take skin into account when making spoof determinations.

In some implementations, the infrared imaging and analysis described throughout this disclosure is combined with visible light imaging and analysis. For example, a visible image and an infrared image may be captured (either simultaneously or in succession) and used together to detect spoof representations.

In some implementations that use visible light imaging, a color of the iris is determined based on a visible image, and the spoofing determination is based on the color of the iris in conjunction with the determined metric of differential absorption. Different iris colors may correspond to different expected metrics of different absorption. For example, dark irises may be brighter under infrared illumination than irises of other colors, such that the metric of differential absorption for authentic blue eyes is lower than for dark eye colors. Therefore, the differential absorption threshold (above which an image is determined to show a spoof representation) may be increased when a visible image shows blue eyes. In machine learning approaches, iris color may be included in a feature vector fed into a trained machine learning model.

In some implementations, the pupil can affect spoof identification results. For example, because the pupil is dark under infrared light, the pupil may increase brightness contrast in an infrared eye image, causing false identifications of spoof representations. To account for this and other possible effects, in some implementations a pupil portion of the image is identified and excluded when calculating the metric indicative of differential absorption.

The pupil tends to dilate in low-light environments. Therefore, in some implementations, the visible light environment of the infrared image is detected, and the identification of the spoof representation is based on the detected light environment. For example, in a low-light environment, the pupil is expected to be bigger, which would change (e.g., increase) the determined metric of differential absorption. To account for this effect, in some implementations, the predetermined spoof threshold is adjusted (e.g., increased) for dimmer light environments. In some implementations, a metric indicative of the light environment (e.g., a general brightness level of the environment) is included in a feature vector fed into a trained machine learning model.

Detection of the light environment may be performed by a dedicated sensing device (e.g., an ambient light sensor) or by a visible camera also used for another purpose. For example, a visible camera configured to capture facial images for facial authentication may also be used to capture images indicative of the light environment. In some implementations, a visible facial authentication image is itself analyzed to determine the light environment, e.g., based on brightness, contrast, or both in the visible facial authentication image.

The use of an infrared eye image for spoof identification, as described throughout this disclosure, may be simpler (in terms of algorithmic complexity, computational resources needed, specialized hardware needed, or a combination thereof) than alternative spoof identification techniques. Especially in cases where the biometric authentication process includes another authentication modality (e.g., facial imaging or visible ocular imaging), a subject may already be positioned for capture of the infrared eye image, such that the spoof detection process does not, in some implementations, introduce an additional burden on the subject (e.g., to reposition themselves or perform an additional step). In some implementations, a metric of differential absorption may be calculated based on an image of an eye region, without further image segmentation, reducing the computational resources needed for processing. When image segmentation is to be performed, the eye as a whole, the sclera, and the iris are relatively large eye features that, in some implementations, may be identified relatively easily compared to identification of smaller or less distinct biometric features, which may reduce the computational resources needed.

Continuing in reference to FIG. 4, based on the identification of the spoof representation of a human, access to the secure system is prevented (408). For example, the biometric authentication process may be automatically terminated upon identifying the spoof representation, which may reduce use of computational resources (e.g., processing load/time)

compared to if the biometric authentication process had been allowed to proceed regardless of a spoof identification result.

Besides access to the secure system being prevented, an appropriate message (e.g., "Access Denied") may be displayed on a display, the user may be asked to perform another authentication attempt, etc.

In some implementations, the spoof identification is integrated into a broader authentication determination. For example, the spoof identification (e.g., a score indicative of spoofing probability) and a biometric authentication result (e.g., "match," "no match," or score indicative of a biometric matching probability) may be combined (e.g., assigned weighting factors and averaged) to obtain an overall authentication result, based on which access to the secure system is granted or prevented. Instead, or additionally, overall spoof identification may be performed based on differential infrared absorption information combined with spoof-related data of another modality, e.g., motion-based spoof detection, to obtain an overall spoof identification result.

In some implementations, if the metric representative of differential absorption indicates an authentic representation of a human, then biometric authentication (e.g., facial recognition, ocular recognition, or another biometric recognition method) proceeds in order to determine a final authentication result.

Figure 5:
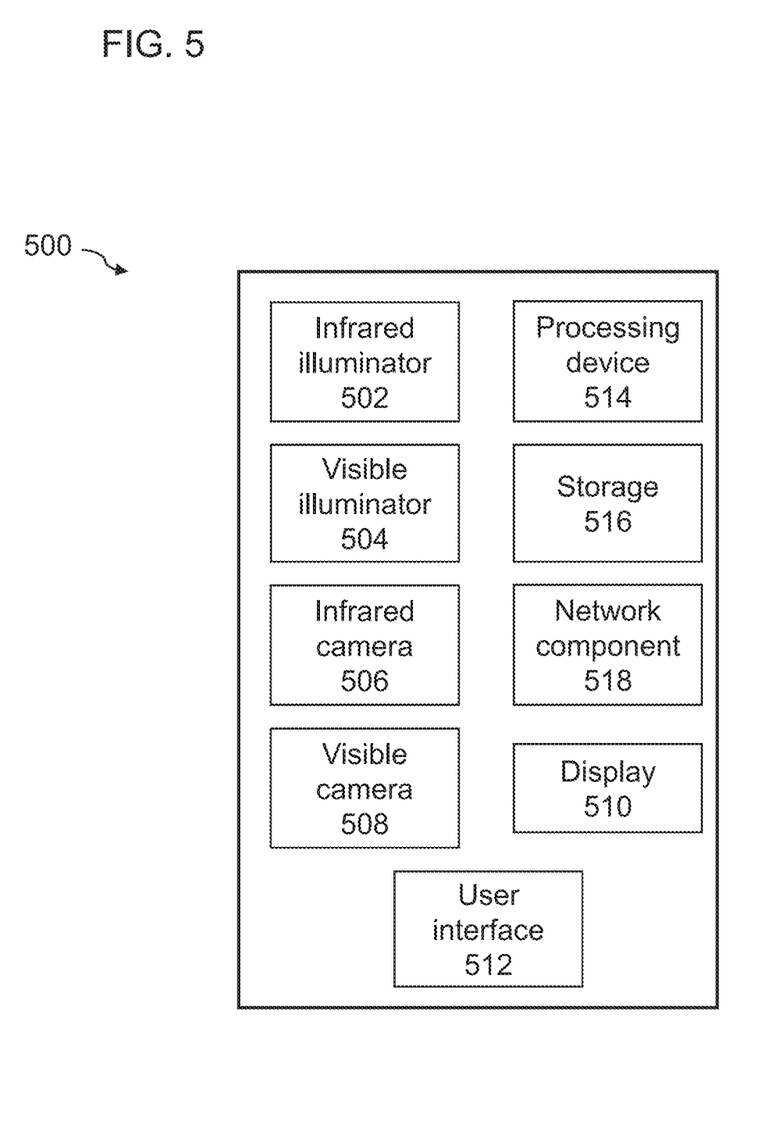
FIG. 5 is a diagram showing an example system configured to identify a spoof representation in accordance with one or more implementations of the present disclosure.

Authentication and spoof-detection processes according to this disclosure may be performed by a variety of devices, including mobile devices (e.g., smartphones), cloud-based systems, and kiosk devices. FIG. 5 shows a device 500 (e.g., a kiosk device) configured to perform image capture, spoof identification, and user interaction functions. However, in some implementations, different processes are carried out by separate devices. For example, in some implementations a first device captures one or more infrared images of a user's eye region (in some implementations, one or more visible images are also captured) and transmits the images to a remote computing system (e.g., a cloud-based server system), after which the remote computing system performs the operations described in reference to FIG. 4 and throughout this disclosure. A remote computing system may possess more computational resources than a subject-side device and may therefore be better suited to perform computer vision processing, machine learning processing, and other algorithmic processes.

The device 500 includes an infrared light illuminator 502 and a visible light illuminator 504. The illuminators 502, 504 may include, for example, one or more light emitting diodes. In some implementations, one or both illuminators 502, 504 is included in structured light projection system (e.g., a dot array projection system) configured to illuminate a subject with structured light for depth sensing. In some implementations, illumination by the illuminators 502, 504 is synchronized with image capture, e.g., the infrared light illuminator 502 is enabled and the visible light illuminator 504 is disabled during capture of an infrared image.

Imaging may be performed by an infrared camera 506 and a visible camera 508 (e.g., an RGB camera), which may each include a photosensor array. Types of photosensors include, for example, complementary metal-oxide-semiconductor (CMOS) and charge-coupled devices (CCD). The photosensors of the infrared camera 506 are configured to capture infrared light. In some implementations, one or both cameras 506, 508 may also be used for a separate biometric authentication function, e.g., to capture a facial image of the subject to be used in conjunction with spoof identification to determine an authentication result.

A display 510 may be used to provide feedback and instructions to the subject, e.g., instruction for the subject to reposition their face within a field of view of the cameras 506, 508. A user interface 512 may be configured to receive user input, e.g., a selection of a secure operation to be performed, the secure operation requiring an anti-spoofing check before proceeding.

A processing device 514 (which may include one or more processors working individually or in parallel) is configured to execute instructions stored on a non-transitory, computer-readable storage 516 (in some implementations, including one or more storage devices) in order to perform operations, e.g., the operations described in reference to FIG. 5 and throughout this disclosure. The processing device 514 may transmit instructions to and/or receive data from any or all of the other components of the device 500. For example, the processing device 514 may send a first instruction to the infrared illuminator 502 to cause the infrared illuminator 502 to project infrared light onto a subject, may send a second instruction to the infrared camera 506 to cause the infrared camera 506 to capture an infrared image of the subject, and may subsequently receive the captured infrared image for further processing.

A network component 518 is configured to transmit and receive data to/from a remote system, e.g., by wired and/or wireless network connections (e.g., Internet, satellite, and/or cellular network connections). For example, images captured by the cameras 506, 508 may be transmitted to the remote system for spoof identification, for biometric authentication based on a database of reference images stored at the remote system, or for another process.

Figure 6:
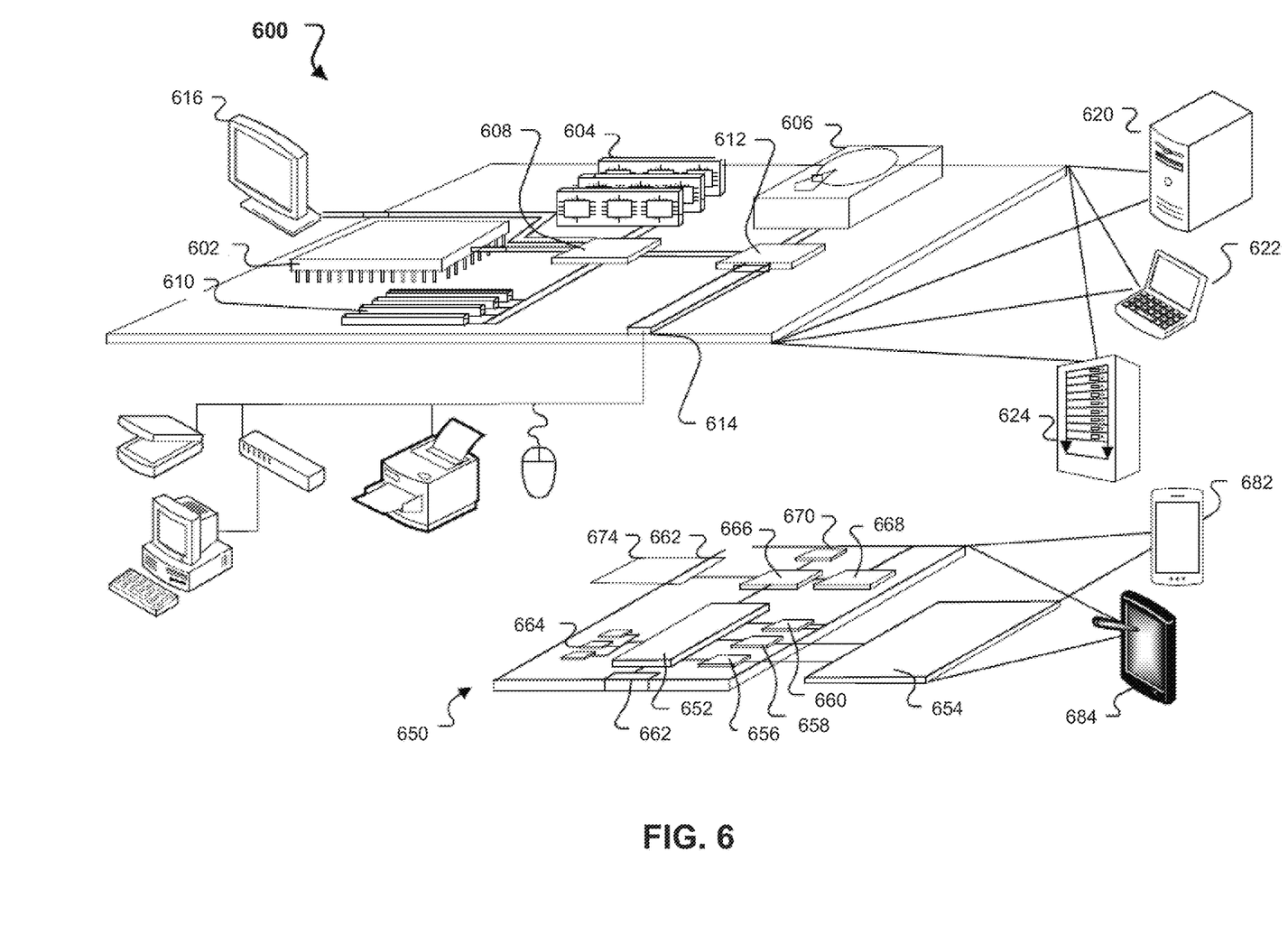
FIG. 6 is a block diagram representing examples of computing devices in accordance with one or more implementations of the present disclosure.

FIG. 6 shows an example of a computing device 600 and a mobile device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 600 includes a processor 602, memory 604, a storage device 606, a high-speed controller 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to the high-speed controller 608, the low speed interface 612, or another interface. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed interface 612 manages lower bandwidth-intensive operations. Such allocation of functions is an example only. In one implementation, the high-speed controller 608 is coupled to memory 604, display 616 (e.g., through a graphics processor or accelerator), and to high-speed expansion ports 610, which may accept various expansion cards (not shown). In the implementation, low-speed interface 612 is coupled to storage device 606 and low-speed bus 614. The low-speed bus port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may include appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, and so forth) and may also include sound generated by applications operating on device 650.

The computing device 650 may be implemented in a number of different forms, as shown in the figure. For example, it may be implemented as a cellular telephone. It may also be implemented as part of a smartphone 682, personal digital assistant, tablet computer 684, or other similar mobile device. The computing device 650 may be implemented as part of a kiosk device.

Figure 7:
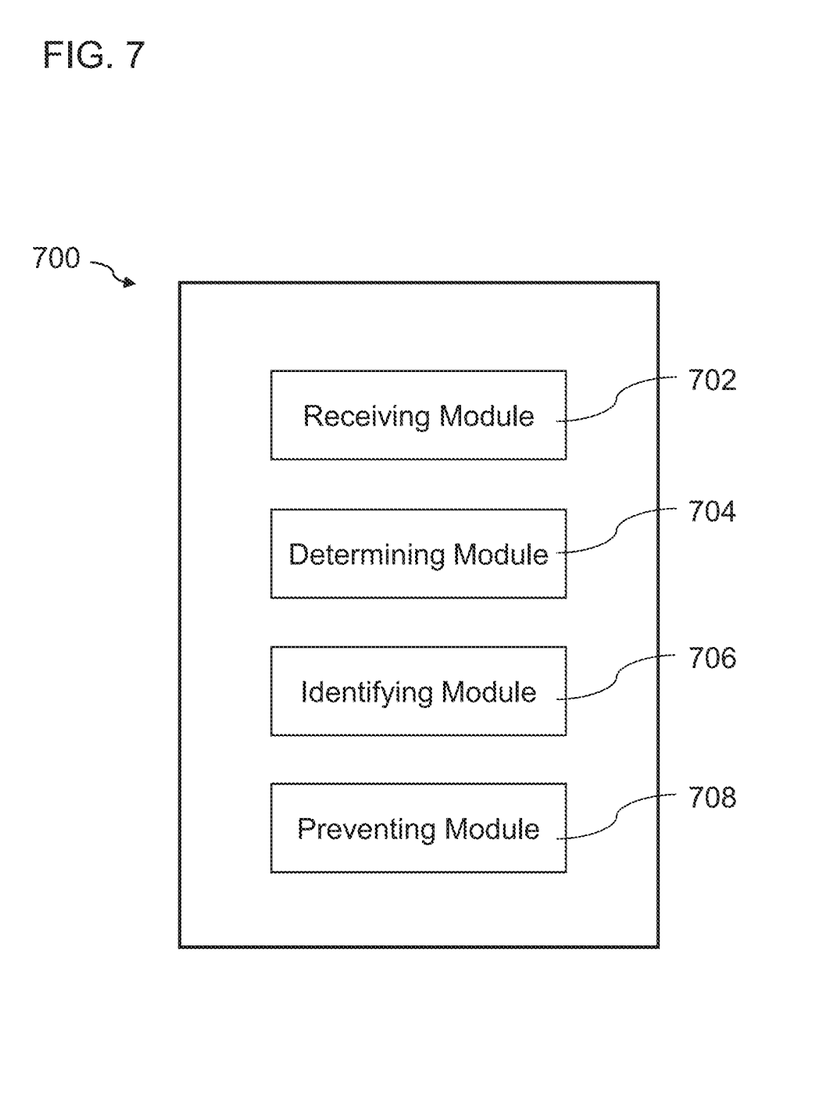
FIG. 7 is a diagram showing examples of modules of an apparatus in accordance with one or more implementations of the present disclosure.

FIG. 7 depicts examples of modules of an apparatus 700 in accordance with one or more implementations of the present disclosure. The apparatus 700 can be an example of an implementation of a system configured to perform spoof identification. The apparatus 700 can correspond to the implementations described above, and the apparatus 700 includes the following: a receiving module 702 that receives a first image of an eye region of a subject captured under illumination by electromagnetic radiation having a wavelength in the 850 nm-1100 nm range; a determining module 704 determines, based on the first image, a metric indicative of differential absorption of the electromagnetic radiation by an iris of the subject and a sclera of the subject; an identifying module 706 that identifies, based on the metric, that the subject is a spoof representation of a human; and a preventing module 708 that, responsive to identifying that the subject is a spoof representation of a human, prevents access to a secure system.

In some implementations, the metric indicative of differential absorption includes a metric of statistical dispersion of brightness in the first image In some implementations, the identifying module 706 determines that the metric indicative of differential absorption is above a predetermined threshold value.

In some implementations, the determining module 704 determines a feature vector based on the first image, the feature vector including brightness values of the iris and of the sclera, and the identifying module 706 inputs the feature vector into a trained classifier, the trained classifier producing an output indicating that the subject is a spoof representation of a human.

In some implementations, the determining module 704 identifies a portion of the first image that includes an eye of the subject, and determines the metric indicative of differential absorption based on the portion of the first image In some implementations, the first image includes skin of the subject, and the determining module 704 determines the metric indicative of differential absorption based on a brightness of the skin in the first image.

In some implementations, the apparatus 700 includes a second receiving module that receives, a second image of the eye region of the subject captured under illumination by electromagnetic radiation having a wavelength in the 380 nm-780 nm range, and the identifying module 706 identifies that the subject is a spoof representation of a human based on the metric and the second image.

In some implementations, the apparatus 700 includes a second identifying module that identifies a color of the iris based on the second image, and the identifying module 706 identifies that the subject is a spoof representation of a human based on the metric and the color of the iris.

In some implementations, the apparatus 700 includes a third determining module that determines a light environment of the subject based on the second image. The apparatus 700 includes a fourth determining module that determines an expected change in pupil size of the subject based on the light environment, and identifying that the subject is a spoof representation of a human is based on the metric and the expected change in pupil size.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback). Input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification the term "engine" is used broadly to refer to a software-based system, subsystem that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A method for detecting spoof attacks on a secure system, the method comprising:
   receiving, by one or more processing devices, a first image of an eye region of a subject captured under illumination by electromagnetic radiation having a wavelength in the 850 nm-1100 nm range;
   determining, by the one or more processing devices, based on the first image, a metric indicative of differential absorption of the electromagnetic radiation by an iris of the subject and a sclera of the subject;
   determining, by the one or more processing devices, at least one of
      a color of the iris, or
      an expected change in pupil size of the subject based on a light environment of the subject;
   identifying, by the one or more processing devices, based on the metric in conjunction with at least one of the color of the iris or the expected change in pupil size, that the subject is a spoof representation of a human; and
   responsive to identifying that the subject is a spoof representation of a human, preventing, by the one or more processing devices, access to the secure system.

2. The method of claim 1, wherein the metric indicative of differential absorption comprises a metric of statistical dispersion of brightness in the first image.

3. The method of claim 1, wherein identifying that the subject is a spoof representation of a human comprises determining that the metric indicative of differential absorption is above a predetermined threshold value.

4. The method of claim 1, wherein determining the metric indicative of differential absorption comprises determining a feature vector based on the first image, the feature vector including brightness values of the iris and of the sclera, and
   wherein identifying that the subject is a spoof representation of a human comprises:
      inputting the feature vector into a trained machine learning model, the trained machine learning model producing an output indicating that the subject is a spoof representation of a human.

5. The method of claim 1, wherein determining the metric indicative of differential absorption comprises:
   identifying a portion of the first image that includes an eye of the subject; and
   determining the metric indicative of differential absorption based on the portion of the first image.

6. The method of claim 1, wherein the first image comprises skin of the subject, and wherein determining the metric indicative of differential absorption is based on a brightness of the skin in the first image.

7. The method of claim 1, comprising:
   receiving, by the one or more processing devices, a second image of the eye region of the subject captured under illumination by electromagnetic radiation having a wavelength in the 380 nm-780 nm range, wherein identifying that the subject is a spoof representation of a human is based on the metric and the second image.

8. The method of claim 7, comprising:
   determining, by the one or more processing devices, the color of the iris based on the second image.

9. The method of claim 1, comprising:
   determining, by the one or more processing devices, the light environment of the subject based on a second image captured under illumination by electromagnetic radiation having a wavelength in the 380 nm-780 nm range or based on output from an ambient light sensor.

10. A system comprising:
    one or more image acquisition devices configured to capture a first image of an eye region of a subject under illumination by electromagnetic radiation having a wavelength in the 850 nm-1100 nm range; and
    one or more processing devices configured to perform operations comprising
       receiving the first image of the eye region of the subject,
       determining, based on the first image, a metric indicative of differential absorption of the electromagnetic radiation by an iris of the subject and a sclera of the subject,
       determining, by the one or more processing devices, at least one of
          a color of the iris, or
          an expected change in pupil size of the subject based on a light environment of the subject,
       identifying, based on the metric in conjunction with at least one of the color of the iris or the expected change in pupil size, that the subject is a spoof representation of a human, and
       responsive to identifying that the subject is a spoof representation of a human, preventing access to a secure system.

11. The system of claim 10, wherein the metric indicative of differential absorption comprises a metric of statistical dispersion of brightness in the first image.

12. The system of claim 10, wherein identifying that the subject is a spoof representation of a human comprises determining that the metric indicative of differential absorption is above a predetermined threshold value.

13. The system of claim 10, wherein determining the metric indicative of differential absorption comprises determining a feature vector based on the first image, the feature vector including brightness values of the iris and of the sclera, and
    wherein identifying that the subject is a spoof representation of a human comprises:
       inputting the feature vector into a trained machine learning model, the trained machine learning model producing an output indicating that the subject is a spoof representation of a human.

14. The system of claim 10, wherein determining the metric indicative of differential absorption comprises:
   identifying a portion of the first image that includes an eye of the subject; and
   determining the metric indicative of differential absorption based on the portion of the first image.

15. The system of claim 10, wherein the first image comprises skin of the subject, and wherein determining the metric indicative of differential absorption is based on a brightness of the skin in the first image.

16. The system of claim 10, wherein the operations comprise:
   receiving a second image of the eye region of the subject captured under illumination by electromagnetic radiation having a wavelength in the 380 nm-760 nm range, wherein identifying that the subject is a spoof representation of a human is based on the metric and the second image.

17. The system of claim 16, wherein the operations comprise:
   determining the color of the iris based on the second image.

18. The system of claim 10, wherein the operations comprise:
   determining the light environment of the subject based on a second image captured under illumination by electromagnetic radiation having a wavelength in the 380 nm-780 nm range or based on output from an ambient light sensor.

19. The system of claim 10, comprising an infrared illuminator configured to illuminate the subject with the electromagnetic radiation having the wavelength in the 850 nm-1100 nm range for capture of the first image.

20. One or more machine-readable storage devices storing machine-readable, non-transitory instructions that, when executed by one or more processing devices, cause the one or more processing devices to perform operations comprising:
   receiving a first image of an eye region of a subject captured under illumination by electromagnetic radiation having a wavelength in the 850 nm-1100 nm range;
   determining, based on the first image, a metric indicative of differential absorption of the electromagnetic radiation by an iris of the subject and a sclera of the subject;
   determining, by the one or more processing devices, at least one of
      a color of the iris, or
      an expected change in pupil size of the subject based on a light environment of the subject;
   identifying, based on the metric in conjunction with at least one of the color of the iris or the expected change in pupil size, that the subject is a spoof representation of a human; and
   responsive to identifying that the subject is a spoof representation of a human, preventing access to a secure system.

* * * * *